United States Patent
Massa

[15] 3,656,097
[45] Apr. 11, 1972

[54] SIGNAL PROCESSING SYSTEM FOR EXTRACTING A PERIODIC SIGNAL OF UNKNOWN FREQUENCY FROM A HIGH LEVEL BACKGROUND NOISE

[72] Inventor: Donald P. Massa, Cohasset, Mass.
[73] Assignee: Massa Division Dynamics Corporation of America, Hingham, Mass.
[22] Filed: Dec. 29, 1969
[21] Appl. No.: 888,451

[52] U.S. Cl.............................340/5 R, 324/77 C, 324/79 R, 340/3 FM
[51] Int. Cl.....................................G01r 23/14, H04b 11/00
[58] Field of Search................343/100 CL; 324/77 B, 77 C, 324/77 CS, 77 G, 79; 340/3 D, 3 FM, 5

[56] References Cited

UNITED STATES PATENTS 3,364,426  1/1968  Hurvitz..............................324/77 C

*Primary Examiner*—Richard A. Farley
*Attorney*—Louis Bernat

[57] ABSTRACT

A detector identifies the frequency of a periodic signal buried beneath the threshold of background noise. A correlator compares the frequency of the output of a sweep generator with the incoming signal. When the correlator indicates that the frequency of the sweep generator output coincides with that of the periodic signal, a recording is made of the sweep generator output.

16 Claims, 2 Drawing Figures

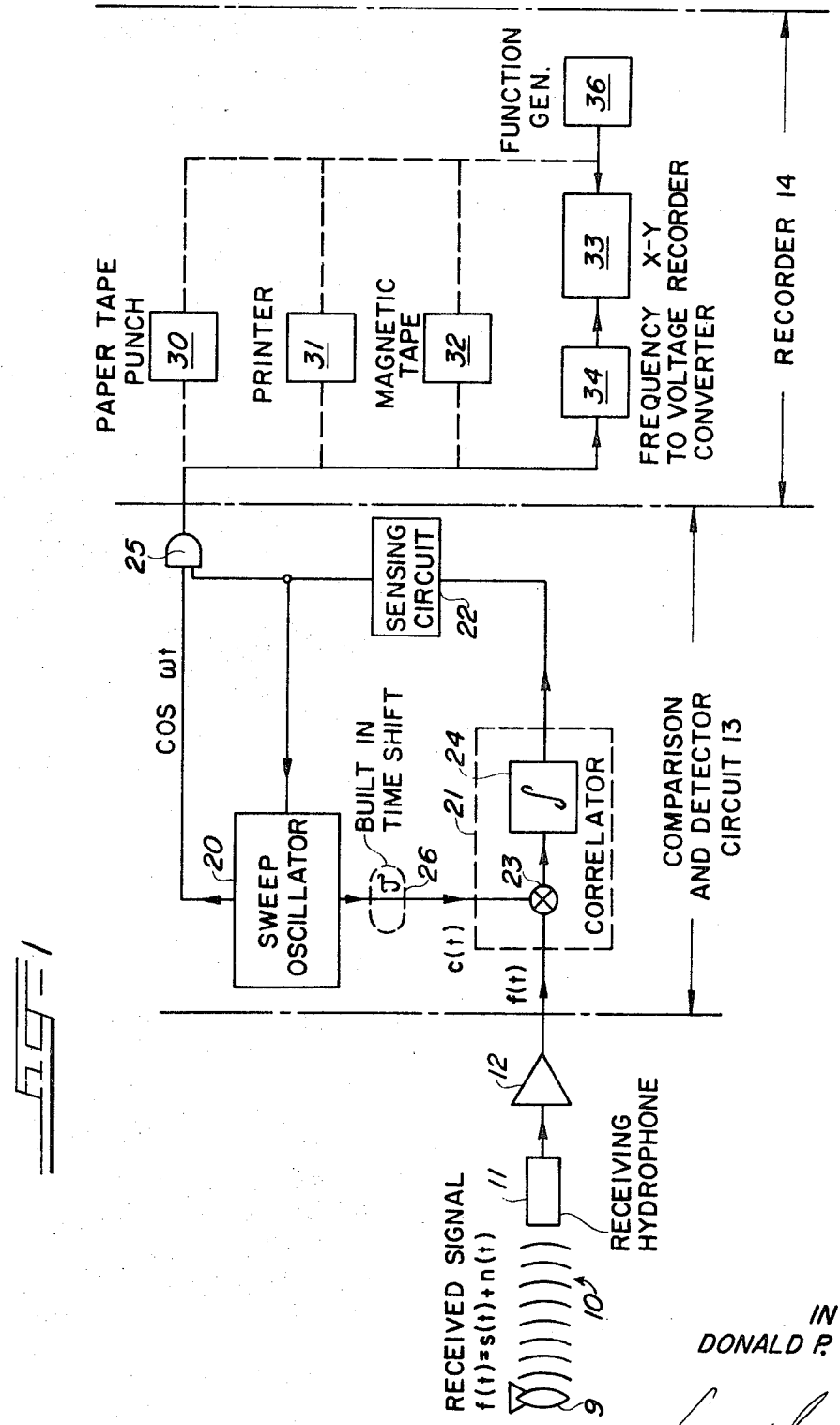

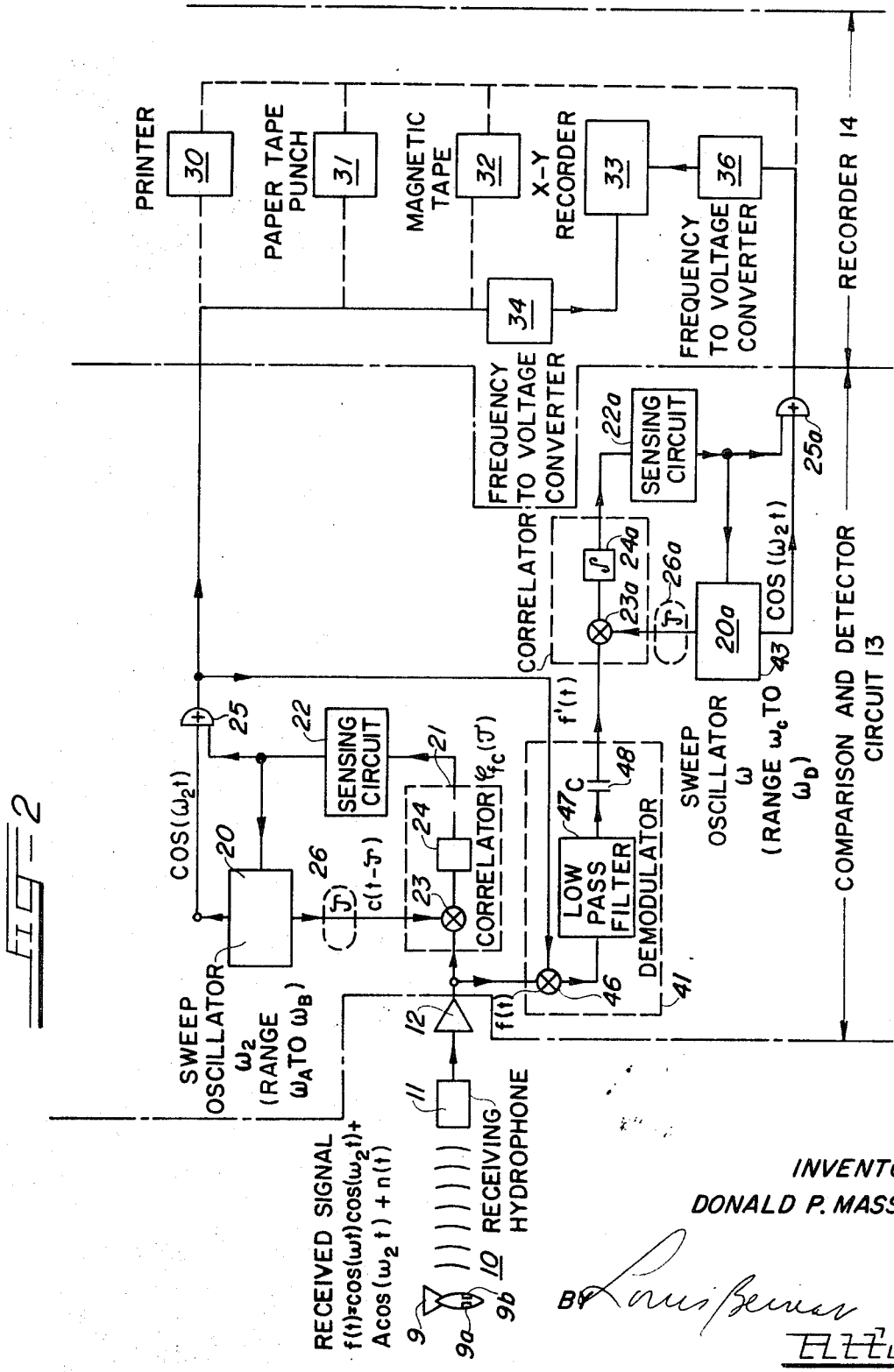

SIGNAL PROCESSING SYSTEM FOR EXTRACTING A PERIODIC SIGNAL OF UNKNOWN FREQUENCY FROM A HIGH LEVEL BACKGROUND NOISE

This invention relates to weak signal detectors, and more particularly to detectors for identifying the frequency of periodic signals buried below the threshold level of background noise.

There are many occasions when it may be necessary to detect weak signals of the described type. For example, probes traveling over very long distances may be required to transmit telemetered information back to a home station. Generally, these probes must be completely self-contained, and space within the probe is very limited. Their batteries have limited capacity, and their transmitters and antenna are small and simple.

The nature of the probe is not too important. It could be a deep space probe traveling to distant planets. It could also be a deep water sonic instrument such as shown in two co-pending applications: Ser. No. 790,065, filed Jan. 14, 1969 by Frank Massa, now U.S. Pat. No. 3,561,268 titled "Expendable Bathythermograph," and Ser. No. 798,310, filed Feb. 11, 1969 by Frank Massa, titled "Instrument for Direct Measurement of the Velocity of Sound in a Fluid," and assigned to the assignee of this invention. These exemplary probes must return their signals through space or the ocean water, respectively, where noises have a strength which exceeds the signal strength of the telemetered information.

Of course, probes are not the only devices which encounter the problems inherent in a detection of periodic signals buried beneath the noise level. For example, certain bio-medical sensors attached to a human or other animal produce signals which represent periodic body functions, such as the heart beat, for example. Other body functions may generate noises which tend to mask the desired signals. Therefore, still other uses for the invention will readily occur to those who are skilled in the art, and it should be understood that the invention has broad applications going beyond the specific examples and structures set forth herein.

Nevertheless, a concrete example does have an instructive value since it tends to explain and highlight the true nature of the invention. More particularly, the instrument described in the above-identified co-pending application Ser. No. 798,310 comprises a free-falling underwater probe. Responsive to the speed of sound in the vicinity of the probe, two sensors on the probe alter the frequency of an electrical signal generated by equipment within the probe. A transmitting transducer responds to this altered signal by radiating an acoustic signal or sound waves outwardly into the water as the falling body drops through the ocean. The acoustic signal includes a carrier which varies in frequency as a function of the velocity of sound in the water at the position of the falling probe. A superimposed low frequency amplitude modulates the carrier as a function of the depth of the probe.

If the probe is to be manufactured at low cost, its acoustic power output must be held at moderately low levers. As a result, the radiated signal may become submerged in a background of ambient noise before it reaches a receiving hydrophone attached to the hull of a moving ship, for example.

Accordingly, an object of the invention is to provide new and improved weak signal detectors. More particularly, an object is to provide detectors for periodic signals which are buried below the threshold level of ambient background noise. In this connection, an object is to identify the frequency of a carrier when the only known characteristic of such carrier is that its frequency may vary within a defined range of values. Another object of this invention is to provide a signal processing system for detecting and identifying an unknown low frequency modulation signal superimposed on the carrier signal.

Still another object of this invention is to detect the frequency of an oscillatory signal having an intensity level which is below the corresponding level of the random noise signals within which the oscillatory signal is immersed. Here an object is to increase the effective signal-to-noise ratio of discrete, but unknown, frequency components submerged within and masked by random background noise. More specifically, an object of this invention is to provide a signal processing system which is capable of separating and identifying the frequency of a carrier frequency and the frequency of an amplitude modulated signal superimposed on the carrier frequency when the signals are submerged in a masking noise background. A further object is to convert the identified frequencies into voltage signals which are applied to the X- and Y-axes of an X-Y recorder for plotting the continuous relationship between the two frequencies as a function of time.

These and other objects are accomplished by a preferred embodiment of the invention which may be understood best from a study of the following description and the accompanying drawings, in which:

FIG. 1 is a block diagram of a first embodiment of a weak signal detector circuit for indicating the frequency of a single unknown periodic signal; and FIG. 2 is a block diagram of a second embodiment of a weak signal detector for indicating two frequencies which are a carrier and its low frequency amplitude modulating signal.

More particularly, Fig. 1 is a block diagram illustrating a relatively simple form of a signal processing system for identifying the frequency or period of an oscillatory or periodic signal immersed in noisy background. This system is particularly useful with an expendable bathythermograph probe 9, described in the co-pending application Ser. No. 790,965. Probe 9 sends sonic energy of a single frequency, indicating ambient temperature, through the ocean and its masking, background noise. The system includes an X-Y or other recorder for automatically plotting a temperature vs. depth profile responsive to information extracted from the noise.

The principal elements and features shown in Fig. 1 are the probe 9 for sending out the sound waves 10 containing the signal and the background noise, a receiving hydrophone 11, amplifier 12, a comparison circuit 13, and a recorder 14. The sound waves 10 are a combination of telemetered signals and ambient noise in the water. The receiving hydrophone 11 may have any convenient form for converting these sonic signals into corresponding electrical signals. The amplifier 12 is any device capable of increasing the strength of the incoming signal.

The comparison circuit 13 includes a sweep oscillator 20, a correlator 21, and a sensing circuit 22. The sweep oscillator 20 is a free-running device having an output which continuously changes frequency in a known manner. The sensing circuit 22 is any suitable device which can respond to an input signal received from correlator 21 and can supply an output signal which automatically locks the sweep oscillator 20 at the frequency which it is generating at the instant during its sweep when the correlator output signal appears. The output of the sensing circuit 22 also activates the AND-gate 25, thereby allowing the frequency of sweep oscillator 20 to be recorded by the recorder 14. After the signal has been recorded, the sensing circuit 22 resets the sweep oscillator 20 to start a new sweep.

The correlator 21 comprises a multiplication circuit 23 which has two inputs connected to the output of amplifier 12 and sweep oscillator 20. The multiplier 23 combines the received signal 10, $f(t)$, with the varying output, $c(t)$, of the sweep oscillator 20. The output terminal of the multiplication circuit 23 is connected to an integrator circuit 24, which may be an operational amplifier with capacitive feedback.

The sensing circuit 22 operates upon detection of an output signal from the correlator 21. Responsive thereto, an output of the sensing circuit 22 locks the sweep oscillator 20 at the then existing frequency, which is the same as the frequency of the received signal. The output of the sensing circuit 22 and the sweep oscillator 20 coincide at the inputs of an AND-gate 25. Responsive thereto, the AND-gate 25 triggers any suitable recording device, such as a paper tape punch 30, a printer 31, a magnetic tape recorder 32, or an X-Y recorder 33.

A frequency-to-voltage converter 34 provides an interface to translate the frequency of the signals received from the sweep oscillator 20 into a drive signal for one axis of the X-Y recorder 33. Likewise, any suitable interface circuits may be provided between the gate 25 and the various recording devices 30-32. After a frequency is recorded, the frequency-to-voltage converter 34 will hold at that frequency level until it is reactivated by a new frequency.

Since it is assumed that one of the variables in the signal 10 is a known function of time, that variable may be simulated by a function generator 36. For example, the two above-identified co-pending applications are used in connection with a freely falling ocean probe 9 (the instantaneous depth of the probe varies linearly with respect to time). Therefore, the depth of the reporting probe is simulated by a proper linear voltage, generated at 36. However, the function generator 36 could be made to simulate any other function to produce any desired relationship between the depth of the probe and a desired time scale on the plot.

During the recording, a data point is measured and recorded for each successive sweep of the oscillator. After the point is so recorded, the oscillator 20 automatically resets to its minimum frequency value and again sweeps through its operational range until another finite data point is detected at the output of the correlator. Or, if the unknown frequency is changing slowly as a function of time, the sweep oscillator 20 could be made to partially reset to a particular frequency value $\Delta f$ behind the last recorded frequency value instead of going all the way back to the minimum frequency. For each sweep of the oscillator, a data point is produced which is recorded by the recorder 33. If the local oscillator 20 reaches its maximum frequency value without producing a signal at the correlator output, the oscillator 20 instantaneously returns to its minimum frequency setting and immediately re-sweeps through its frequency range.

The operation of the circuit of Fig. 1 may be explained best by a mathematical analysis of how the signal is extracted from the background noise. In greater detail, there is a great improvement in signal-to-noise ratio, responsive to the use of a modified cross-correlation system for extracting the desired periodic signal from the background noise. The average cross-correlation between two functions, $f_1(t)$ and $f_2(t)$ is defined by the equation:

$$\bar{\varphi}_{12}(\tau) = \lim_{T \to \infty} \frac{1}{T} \int_{-T/2}^{T/2} f_1(t) f_2(t-\tau) dt \quad (1)$$

For two periodic waves, each with periods $T_1$, equation (1) can be modified to the form:

$$\bar{\varphi}_{12}(\tau) = \frac{1}{T_1} \int_{-T_1/2}^{T_1/2} f_1(t) f_2(t-\tau) dt \quad (2)$$

From equation (1), it is seen that the cross-correlation between any two periodic signals having different periods is zero. By the same reasoning, the cross-correlation between any periodic signal and a random noise signal is also zero.

Therefore, if a periodic signal, $s(t)$, is buried below the threshold of a noise signal, $n(t)$, the function, $f(t)$, representing the total received signal can be defined as:

$$f) = s(t) + n(\text{ti t}) \quad (3)$$

If a locally generated periodic signal, $c(t)$, is such that the period of $c(t)$ equals the period of $s(t)$, and if $f(t)$ is then cross-correlated with $c(t)$, the following results are obtained:

$$\bar{\varphi}_{fc}(\tau) = \frac{1}{T_1} \int_{-T_1/2}^{T_1/2} [s(t) + n(t)] c(t-\tau) dt \quad (4)$$

$$= \bar{\varphi}_{sc}(\tau) + \bar{\varphi}_{nc}(\tau)^0 = \bar{\varphi}_{ss}(\tau) \quad (5)$$

Equation (5) indicates that when the period of the locally-generated signal, $c(t)$, is the same as the period of the received periodic signal, $s(t)$, the cross-correlation function equals the auto-correlation of $s(t)$. If the period of $c(t)$ is different from the period of $s(t)$, the cross-correlation of $f(t)$ with $c(t)$ equals zero.

The receiving hydrophone 11, in Fig. 1, picks up the received signal 10 which is mathematically represented by the notation $f(t)$. This signal contains the velocimeter or bathythermograph transmitted signal $s(t)$ plus the background noise signal designated as $n(t)$. The total received signal $s(t) + n(t)$ is amplified at 12 and fed into the correlator 21. The sweep ocaillator 20 generates a signal, $c(t)$, which continually sweeps between lower and upper frequency limits defining the frequency range of signals generated by the falling probe. Since the output of the sweep oscillator 20 includes an arbitrary built-in time shift $\tau$, the actual signal, $c(t)$, from the sweep oscillator is equivalent to a signal $c(t-\tau)$.

The correlator 21 performs the operation described by the equation (2), which is to multiply the two input signal functions, $f(t)$ and $c(t)$. The product of these two functions (the output of circuit 23) is then passed through the integrating circuit 24 in the correlator to a sensing circuit 22. When the frequencies of the received signal and the locally generated signal coincide, the sensing circuit generates an output signal. The oscillator 20 then locks at the particular frequency that is being generated. Therefore, the correlator 21 merely multiplies the function $c(t)$ by $f(t)$ and then integrates the product to yield the cross-correlation function $\bar{\varphi}_{fc}(\tau)$. When the period of $c(t)$ is different from the period of $s(t)$, the cross-correlation function is zero. However, when the periods are the same, the correlator 21 produces a finite output which is detected by the sensing circuit 22, and that detection in turn stops the local oscillator 20 from sweeping.

Under the conditions where the probe 9 (Fig. 2) is a velocimeter or a bathythermograph which transmits an amplitude modulated carrier wave, an X-Y plot is automatically recorded showing the water temperature or sound velocity versus depth profile, as it is being measured by the falling probe. More particularly, Fig. 2 schematically illustrates a more complex embodiment in which a high frequency carrier signal, of unknown frequency composition, has a superimposed amplitude modulation frequency. These two frequency values result from readings taken by the two sensors 9a, 9b, mounted on the probe 9, which send out two signals that are separately identified and converted into voltage magnitudes for operating an X-Y recorder. The relationship between the identified frequencies are plotted continuously as a function of time.

In this situation, the problem of detection is complicated because it is necessary to eliminate the noise component, $n(t)$, from the received signal, $f(t)$, without disturbing the frequency composition of the modulated transmitted signal from the velocimeter probe. To solve this complex problem, I first detect the carrier frequency component in the modulated signal portion of the received signal by utilizing the same procedure as described above in connection with Fig. 1. Then, I utilize the detected carrier frequency signal to demodulate the received modulated signal while amplitude is still masked by ambient noise for determining the low frequency component of the modulated signal. A specific method for achieving this objective is illustrated in Fig. 2.

The specific system illustrated in Fig. 2 is hereinafter described in connection with the velocimeter probe described in co-pending application Ser. No. 798,310. The two identified frequencies vary as a function of time and represent the actual sound velocity profile of the ocean during the fall of the probe. In such an instance, the received signal includes a low frequency component which is proportional to the depth of the falling probe. This component amplitude modulates a carrier, the frequency of which is proportional to the velocity of sound in the vicinity of the probe. Accordingly, the system of Fig. 2 provides means for retrieving both the carrier and the modulating frequencies.

Those elements which appear in both Figs. 1 and 2 bear the same reference numbers. Therefore, no effort is here made to describe them a second time in reference to Fig. 2.

The remaining components in Fig. 2 include an AND-gate 25a, a demodulator 41, a correlator 42, and a second sweep oscillator 43. When the sensing circuit 22 produces an output signal, the AND-gate 25 is also activated. The output of the AND-gate 25 is then a square wave of the same frequency as $c(t)$ which is also the same frequency as $s(t)$. The duty cycle of this square wave can be controlled by biasing the signal $c(t)$ before it is fed into the AND-gate 25. The square wave signal from the AND-gate 25 is fed to the input of the demodulator 41 where it is multiplied by the received signal 10 at the multiplier 46. This product is then passed through a low-pass filter 47 and a series capacitor 48, which effectively demodulates the periodic components present in the received signal, $f(t)$, even when the signal-to-noise ratio of the periodic signals is very much less than unity. If the demodulation were attempted by conventional means, such as in the well known use of a diode detector, the periodic components could not be detected unless their signal strength at the receiver is considerably above the ambient noise level. The resultant output from the demodulator, $f'(t)$, contains only the low frequency component of $f(t)$ plus the noise signal $n(t)$.

The low frequency signal $f'(t)$ is fed into a second correlator 42 which is essentially the same as the correlator 21, except that the sweep oscillator 20a varies over the known range of the low frequency component of the transmitted signal. The same reference numerals are also associated with the correlator 42 to identify the same functional circuits which were described in connection with correlator 21.

Upon reflection, it should be apparent that the output frequency of the sweep oscillator 20 corresponds to the frequency of the original high frequency carrier, and the output frequency of the sweep oscillator 20a corresponds to the frequency of the original low frequency modulating signal. The carrier wave simulating frequency from oscillator 20 is fed through a frequency-to-voltage converter 34 to one axis of an X-Y recorder. The modulating wave simulating frequency from oscillator 20a is fed through a similar converter 36 to the other axis of the X-Y recorder.

In greater detail, the amplitude modulated signal, $s(t)$, which is being transmitted by the falling probe, may be represented by the formula:

$$s(t) = [\cos \omega_1 t + A] \cos \omega_2 t$$
$$= \cos \omega_1 t \cos \omega_2 t + A \cos \omega_2 t \qquad (6)$$

where:
$\omega_1$ = frequency proportional depth
$\omega_2$ = frequency proportional to sound velocity
$A$ = a constant.

The received signal 10, $f(t)$, is picked up by the receiving hydrophone 11. It is equal to $s(t)+n(t)$ (where $n(t)$ is the noise signal. This signal, $f(t)$, is first amplified and then fed into the input of the correlator 21. The local sweep oscillator 20 generates a frequency $\omega_2$ that varies over the range from $\omega_A$ to $\omega_B$, corresponding to the limits of the carrier frequency range transmitted by the falling probe. This oscillator 20 is connected to the second input of the correlator 23. The output of the correlator 21 is zero except when the sweep oscillator 20 is generating a frequency $\omega_2$ which is equal to the received frequency $f(t)$.

When the output frequency of sweep oscillator 20 coincides with the received carrier frequency, a signal appears at the output of the correlator 21. The sensing circuit 22 causes the oscillator 20 to lock on the frequency $\omega_2$, which is identical to the carrier frequency. Therefore, this frequency is also proportional to the speed of sound in the vicinity of the probe.

The sensing circuit 22 also activates the AND-gate 25 which produces a square wave of frequency $\omega_2$. This square wave is fed into the input of the demodulator 41 where it is multiplied with the received signal, $s(t)$. The resulting product is passed through the low-pass filter 47 and capacitor 48. This effectively detects and retrieves the periodic components present in the received signal. The output of the AND-gate 25 is also fed into the frequency-to-voltage converter 34 which in turn controls the "velocity" axis of the X-Y recorder 33.

The resultant output, $f'(t)$, from the demodulator 41, contains the periodic signal $\cos \omega_1 t$ plus the noise signal, $n(t)$. This output, $f'(t)$ is applied to the input of a second correlator 42. A second sweep oscillator 20a generates a frequency, $\omega_1$, which varies over the range, $\omega_C$ to $\omega_D$. These limits correspond to the limits of the modulation frequency (in received signal 10), which represents the depth of the falling probe. The output of oscillator 20a is applied to the second input of the correlator 42 which performs in the manner described above in connection with the correlator 21 of Fig. 1.

When an output signal appears across the second correlator 42, a sensing circuit 22a locks the oscillator 20a at its then prevailing output frequency, $\omega_1$. The sensing circuit 22a also activates the AND-gate 25a which will produce a square wave output of frequency $\omega_1$. This signal is passed on to the frequency-to-voltage converter 36, which in turn controls the "depth" axis of the X-Y recorder 36. When both sweep oscillators 20 and 20a are so locked on the respective frequencies, $\omega_1$ and $\omega_2$, there is a detection of the instantaneous information corresponding to the velocity of sound and the depth of the reporting probe. If these two frequencies, $\omega_1$ and $\omega_2$, are converted into corresponding voltages and then applied to the inputs of an X-Y recorder, a complete velocity versus depth profile is automatically plotted during the drop of the free-falling probe. At the same time, the two frequencies may also be recorded in any other suitable manner, as on paper tape, magnetic tape, printers, or any other type of data storage equipment.

The two signal processing systems described in this invention enable the detection of periodic signals having unknown frequency. By utilizing a modified correlation technique, a variable frequency signal is supplied to the input of the correlator from a sweep oscillator which continuously scans the frequency range within which the unknown frequency is known to exist. This signal processing method enables the detection of an unknown carrier, with an amplitude modulated signal, which lies buried in noise background.

The invention has been described as having particular utility with expendable velocimeters and bathythermographs which transmit signals of variable frequency corresponding to the oceanographic data being measured. However, the invention is not limited to these specific applications. Other uses and modifications of the invention will readily occur to those skilled in the art. Therefore, the claims are to be construed broadly enough to cover all equivalents falling within the true scope and spirit of the invention.

I claim:

1. A signal processing system for detecting the presence of a first signal of unknown frequency $\omega_1$ which is known to be between the upper and lower frequency limits $\omega_A$ and $\omega_B$ and which is buried within a stronger random noise background, said system comprising receiver means for picking up the first signal and the associated background noise, means including a sweep oscillator for generating a second electrical signal of a frequency which is continuously varied between the limits $\omega_A$ and $\omega_B$, correlator means for comparing said first and said second electrical signals, means connected to the output of said correlator means for sensing when the output frequency of said sweep oscillator is equal to said unknown frequency $\omega_1$, and means responsive to the activation of said sensing means by an output signal from the correlator for temporarily locking the oscillator frequency during its sweep.

2. The system of claim 1 and recording means for recording the oscillator frequency at the instant during each successive sweep when the sensing circuit detects the presence of an output signal from the correlator.

3. The invention in claim 2 and means for recording a linearly varying signal to give said oscillator frequency recording a time base reference.

4. The system of claim 1 and means for making a frequency-to-voltage convertion, an X-Y recorder, a variable voltage supply means having an output with a characteristic which varies linearly as a function of time, means for applying said locked oscillator output signal to the input of said frequency-to-voltage converter means, means for applying the output of said frequency-to-voltage converter means to one input channel of said X-Y recorder, and means for connecting said variable voltage supply means to the other input channel of said X-Y recorder.

5. A system for measuring an oceanographic parameter comprising a probe containing sensor controlled means for converting the magnitude of said oceanographic parameter into an oscillatory electrical signal having a frequency which varies as a function of said parameter, means for converting and transmitting said oscillatory electrical signal into the ocean as an underwater acoustic signal, receiving hydrophone means for receiving and converting said underwater acoustic signal into an oscillatory electrical signal, correlator means having two inputs, sweep oscillator means for generating an oscillatory signal which sweeps continuously over a frequency range within which said underwater acoustic signal is known to exist, means for individually connecting the outputs of said hydrophone and said sweep oscillator to the two input terminals of said correlator, and means comprising a sensing circuit connected to the output of said correlator for temporarily locking the frequency of the oscillator at the instant during its sweep when the sensing circuit is activated by an output signal from the correlator.

6. The system of claim 5 and recording means for recording the oscillator frequency at the instant during each successive sweep when the sensing circuit means detects the presence of an output signal from the correlator.

7. The system of claim 6 and means for recording a time base signal to give said oscillator frequency a time base reference on said recording.

8. The system of claim 5 and means comprising a frequency-to-voltage converter for translating said acoustic signal into a recordable signal, an X-Y recorder, a variable voltage supply means having an output which is controlled to vary as a function of time, means for applying said locked oscillator output signal to the input of said frequency-to-voltage converter means, means for connecting the output of said frequency-to-voltage converter to one input channel of said X-Y recorder, and means for connecting said variable voltage supply means to the other input channel of said X-Y recorder.

9. A signal processing system for detecting the presence, within a high noise background, of a weak amplitude modulated carrier signal of unknown carrier frequency $\omega_2$ which is between the frequency limits $\omega_A$ and $\omega_B$ and of an unknown frequency $\omega_1$ modulated on said carrier, wherein said frequency $\omega_1$ is between the frequency limits $\omega_C$ and $\omega_D$, said system including receiver means for converting said modulated carrier and associated background noise into a first electrical signal, first sweep oscillator means for generating a second electrical signal having a frequency which continuously varies between the limits $\omega_A$ and $\omega_B$, first correlator means for comparing the frequencies of said first and said second electrical signals, means comprising a first sensing circuit connected to the output of said first correlator means for temporarily locking said first oscillator frequency at the instant during its sweep when the sensing circuit is activated by an output signal from said first correlator means, means responsive to the output of said first sweep oscillator for generating a corresponding square wave, demodulator means connected to the output of said square wave generator for demodulating said first electrical signal, second correlator means connected to the output from said demodulator, means comprising a second sweep oscillator for generating a third electrical signal of a frequency which is continuously varied between the limits $\omega_C$ and $\omega_D$, means for applying said third electrical signal to the input of said second correlator, and means comprising a second sensing circuit connected to the output of said second correlator for temporarily locking the said second oscillator frequency at the instant during its sweep when the said second sensing circuit is activated by an output signal from said second correlator.

10. The system of claim 9 and recording means for simultaneously recording both of the output frequencies which are generated by said first and said second sweep oscillators when both of the sensing circuits have locked the frequencies of both said first and second sweep oscillator during their successive sweep cycles.

11. The system of claim 9 and first and second frequency-to-voltage converter means, an X-Y recorder, means for applying said locked output signal from said first sweep oscillator to the input of said first frequency-to-voltage converter means, means for applying said locked output signal from said second sweep oscillator to the input of said second frequency-to-voltage converter means, and means for applying the outputs of said first and second frequency-to-voltage converter means to the two input channels of the X-Y recorder.

12. A system for simultaneously measuring two oceanographic parameters comprising probe means containing two sensors, means including the first sensor for converting a first of said parameters into a first oscillatory electrical signal, means including the second sensor for converting a second of said parameters into a second oscillatory electrical signal, means for amplitude modulating said first oscillatory signal by said second oscillatory signal, means associated with said probe for converting said modulated electrical signal into an underwater acoustic signal, receiving hydrophone means for converting said modulated acoustic signal to an electrical signal, first sweep oscillator means for generating a first oscillatory signal continuously varying over a frequency range within which the higher carrier frequency component of the modulated underwater signal is known to vary, first correlator means having two inputs, means for connecting said hydrophone means to one of said two inputs and said first sweep oscillator means to the other input of said first correlator, means comprising a first sensing circuit connected to the output of said first correlator for temporarily locking said first oscillator frequency at the instant during its sweep when the sensing circuit is activated by an output signal from said first correlator, means for connecting the output from said first sweep oscillator for generating a square wave form corresponding to said locked frequency, demodulator means driven by the output from said square wave generator for demodulating said hydrophone output signal, second sweep oscillator means for generating a second oscillatory signal continuously varying over a frequency range within which the lower modulation frequency component of the modulated underwater signal is known to lie, means comprising a second correlator connected to the output of said demodulator and to the output of said second sweep oscillator means, second sensing circuit means connected to the output of said second correlator, and means responsive to said second sensing circuit for temporarily locking the said second oscillator frequency at the instant during its sweep when the said second sensing circuit is activated by an output signal from said second correlator.

13. The system of claim 12 and recording means driven by both of the output frequencies generated by said first and second sweep oscillators when in said locked condition.

14. The system of claim 12 and first and second frequency-to-voltage converter means, an X-Y recorder, means for connecting said first sweep oscillator to the input of said first frequency-to-voltage converter, means for connecting said second sweep oscillator to the input of said second frequency-to-voltage converter, and means for connecting the outputs of said first and second frequency-to-voltage converters to the two input channels of the X-Y recorder.

15. A system for measuring the sound velocity versus depth profile in a body of water comprising a probe containing separate sensors for converting the instantaneous values of depth and sound velocity into two separate oscillatory signals, means responsive to one of said separate oscillatory signals corresponding to the depth parameter for amplitude modulating the other oscillatory signal corresponding to the sound velocity parameter, transducer means associated with the probe for converting said amplitude modulated signal into an acoustic signal in the water, means comprising a receiving hydrophone for converting said acoustic signal to an electrical signal, first correlator means, means comprising a first sweep oscillator for generating a first oscillatory signal continuously varying over a frequency range within which the other frequency is known to lie, means for connecting said hydrophone and said first sweep oscillator to input terminals on said first correlator, means comprising a first sensing circuit connected to the output of said first correlator for temporarily locking said first oscillator frequency at the instant during its sweep when the sensing circuit is activated by an output signal from said first correlator, means connected to the output from said first sweep oscillator for generating a square wave signal corresponding to said locked frequency, demodulator means driven by the output from said square wave generator for demodulating said hydrophone output signal, second correlator means connected to the output of said demodulator, means including a second sweep oscillator for generating a second oscillatory signal continuously varying over a frequency range within which the lower modulation frequency component is known to lie, means for applying said second oscillatory signal to the input of said second correlator, second sensing circuit means connected to the output of said second correlator, and means associated with said second sensing circuit for temporarily locking the said second oscillator frequency at the instant during its sweep when the said second sensing circuit is activated by an output signal from said second correlator.

16. A bathythermograph system for measurement of the temperature versus depth profile in a body of water comprising probe means containing separate sensors for converting the instantaneous values of depth and temperature to two separate oscillatory signals, modulating means for combining said separate oscillatory signals so that a first of said oscillatory signals corresponding to the depth parameter amplitude modulates the other oscillatory signal corresponding to the temperature parameter, transducer means associated with the probe for converting said amplitude modulated signal into an acoustic signal transmitted into the water, hydrophone means for converting said acoustic signal to an electrical signal, first correlator means, first sweep oscillator means for generating a first oscillatory signal continuously varying over a frequency range within which the other frequency component is known to lie, means for connecting said hydrophone and said first sweep oscillator to the input terminals of said first correlator means, a first sensing circuit means connected to the output of said first correlator for temporarily locking said first oscillator frequency at the instant during its sweep when the sensing circuit is activated by an output signal from said first correlator, means connected to the output from said first sweep oscillator for generating a square wave corresponding to said locked frequency, demodulator means driven by said square wave for demodulating said hydrophone output signal, second correlator means, means for connecting the output from said demodulator to the input of said second correlator, second sweep oscillator means for generating a second oscillatory signal continuously varying over a frequency range within which the first frequency component is known to lie, means for applying said other oscillatory signal to the input of said second correlator, and second sensing circuit means connected to the output of said second correlator for temporarily locking the said second oscillator frequency at the instant during its sweep when the said second sensing circuit is activated by an output signal from said second correlator.

* * * * *